(12) United States Patent
Genc et al.

(10) Patent No.: US 8,504,214 B2
(45) Date of Patent: Aug. 6, 2013

(54) SELF-HEALING POWER GRID AND METHOD THEREOF

(75) Inventors: Sahika Genc, Schenectady, NY (US); Ibrahim Gokcen, Istanbul (TR)

(73) Assignee: General Electric Company, Niskayuna, NY (US)

( * ) Notice: Subject to any disclaimer, the term of this patent is extended or adjusted under 35 U.S.C. 154(b) by 321 days.

(21) Appl. No.: 12/818,206

(22) Filed: Jun. 18, 2010

(65) Prior Publication Data

US 2011/0313581 A1   Dec. 22, 2011

(51) Int. Cl.
*G05D 3/12* (2006.01)
(52) U.S. Cl.
USPC ............ 700/292; 700/286; 700/291; 700/295
(58) Field of Classification Search
USPC ................... 700/291, 292, 295, 286
See application file for complete search history.

(56) References Cited

U.S. PATENT DOCUMENTS

| | | | |
|---|---|---|---|
| 4,641,248 A * | 2/1987 | Suzuki et al. | 700/292 |
| 7,055,052 B2 | 5/2006 | Chalasani et al. | |
| 7,184,903 B1 | 2/2007 | Williams et al. | |
| 7,191,329 B2 * | 3/2007 | Murphy | 713/100 |
| 7,373,222 B1 * | 5/2008 | Wright et al. | 700/295 |
| 7,389,189 B2 | 6/2008 | Williams et al. | |
| 7,519,438 B2 * | 4/2009 | Barbour et al. | 700/22 |
| 2008/0112474 A1 | 5/2008 | Refaeli | |
| 2009/0187284 A1 * | 7/2009 | Kreiss et al. | 700/291 |
| 2010/0082513 A1 * | 4/2010 | Liu | 706/46 |
| 2011/0010016 A1 * | 1/2011 | Giroti | 700/291 |

FOREIGN PATENT DOCUMENTS

| | | |
|---|---|---|
| WO | 2004008375 A1 | 1/2004 |
| WO | 2009076769 A1 | 6/2009 |

OTHER PUBLICATIONS

Sahika et al., Predictability in Discrete-Event Systems Under Partial Obervation, 2006, IFAC,6 pages.*
Pepyne et al., "Vulnerability Assessment and Allocation of Protection Resources in Power Systems", IEEE, 2001, 6 pages.*
Faza et al., "Reliability Modeling for the Advanced Electric Power Grid", 2007, Springer, 14 pages.*
Sun et al., "Analysis and Comparison on Several Kinds of Models of Cascading Failure in Power System", 2005, IEEE, 7pages.*
Noorian et al., "An Autonomous Agent-based Framework for Self-Healing Power Grid", IEEE, Oct. 2009, 6 pages.*
Liu et al., "Solution for the Crisis in Electric Power Supply" IEEE, 2001, 22-30 pages.*
Purry et al., "Preventive Self-Healing Shipboard Power Distribution Systems" IEEE, 2005, 2 pages.*
Moslehi et al., "Vison for a Self-Healing Power Grid", 2006, ABB Corporate Management Services, 2006, p. 21-25.*

(Continued)

*Primary Examiner* — Kavita Padmanabhan
*Assistant Examiner* — Thomas Stevens
(74) *Attorney, Agent, or Firm* — Scott J. Asmus

(57) ABSTRACT

A method for determining a self-healing power grid status is presented. The method includes receiving respective real-time monitoring data corresponding to one or more power grid components, wherein one or more agents are coupled to the power grid components. The method includes the steps of determining a respective current infectiousness state based upon the received respective real-time monitoring data, determining respective output data based upon the respective current infectiousness state, exchanging the respective output data with one or more neighboring agents, and generating a respective new infectiousness state based upon the respective exchanged output data and a state transition diagram.

18 Claims, 8 Drawing Sheets

OTHER PUBLICATIONS

Joshi-P.M.,Load Shedding Algorithm Using Voltage and Frequency Data, Thesis, 2007, 96 pages.*
Sorensen et al.,"Power Quality and Integration of Wind Farms in Weak in India" Risø National Laboratory, Roskilde Apr. 2000, 66 pages.*
Khosrow Moslehi, Ranjit Kumar; Power highlights—"Vision for a self-healing power grid"; ABB Review Apr. 2006; pp. 21-25.
Khosrow Moslehi, A. B. Ranjit Kumar, Peter Hirsch; "Feasibility of a Self-Healing Grid—Part I Methodology and Cost Models"; Power Engineering Society General Meeting, 2006. IEEE; 8 Pages.
Timothy L. Johnson, Sahika Genc, Stephen F. Bush; "Active Probing for Diagnosis of Emergent Faults"; 2nd IFAC Workshop on Dependable Control of Discrete Systems (2009); 6 Pages.
Louis Rifling; Scientific Commons: "Vigne: Towards a Self-Healing Grid Operating System"; 2008; Downloaded on Sep. 6, 2010 from Internet<http://www.irisa.fr/myriads/web/images/stories/Irilling/Vigne_self_healing.pdf >; 10 Pages.
"The self-healing power grid" Jan. 24, 2005; ABB Group; Downloaded on Sep. 6, 2010 from the internet<:http://www.abb.com/cawp/seitp202/D39C60D6741DAD2F85256F9400508A69.aspx; 1 Page.
The NETL Smart Grid Implementation Strategy (SGIS); "Modern Grid Strategy Team Graduates to New Role as Smart Grid Implementation Strategy (SGIS)"; Downloaded from http://www.netl.doe.gov/smartgrid/ on Sep. 7, 2010; 3 Pages.
Khosrow Moslehi; "Intelligent Infrastructure for Coordinated Control of a Self-Healing Power Grid"; IEEE Canada; Electrical Power & Energy Conference 2008; ABB; 22 Pages.
Interview with Dr. Maher Chebbo; "Intelligent agents to enhance open communication and self-healing"; Feb. 10, 2009; smartelectricnews.com Special; 4 Pages.

* cited by examiner

SELF-HEALING POWER GRID AND METHOD THEREOF

BACKGROUND

A power grid is a combination of interconnected electricity networks that encompasses electricity generation, electricity transmission and electricity distribution. The power grid is a highly complex collective system typically composed of a large number of diverse and complex interacting power grid components. The power grid may refer to a continent's electrical network, a regional transmission network, or simply describe a sub-network, such as, a local utility's transmission and distribution network.

Since the power grid is a collection of diverse, interacting and interconnected power grid components and electricity networks, operation of one or more of the power grid components and the electricity networks in the power grid may be dependent or effect the operations of other power grid components or other electricity networks in the power grid. For example, a failure of one of the power grid components (completely or partially) generally shifts the load of the failed power grid component to nearby power grid components. Therefore, the nearby power grid components are pushed beyond their capacity and become overloaded resulting in a failure of the nearby power grid components. Accordingly, the failure of a power grid component may result in failure of other power grid components and combinations of the failures may result in a large power blackout. Typically, a failure of a power grid component that may trigger failure of other power grid components is referred to as a cascading failure or a cascading fault. The cascading failures may include cascading overloads, failures of protection equipment, transient instability, reactive power problems, voltage collapse, software failures, communication, terrorist acts, vandalism, operational errors, and the like.

Typically, individual operators identify and assess the cascading failures or contingencies in the power grid or a portion of the power grid. In addition, the individual operators try to promptly perform adjustments in the power grid for a continued and reliable operation of the power grid when a potential contingency or a cascading failure is identified. The operators generally rely on alarms generated by an energy management system (EMS), data generated by supervisory control and data acquisition (SCADA), and contingency analysis tools for identifying the potential contingencies or cascading failures. However, the identification of the potential contingencies or the cascading failures requires trained and skilled operators, sophisticated computers and communications, and careful planning and design. Also, the individual operators are accountable for the contingencies and cascading failures in a few portions of the power grid, such as, densely populated metropolitan areas, lines of the power grid that share a common structure or a common failure mode. Therefore, the individual operators may not identify large cascading power blackouts that may occur due to combinations of certain cascading faults or failures.

Hence, it is highly desirable to develop a self-healing power grid that is more reliable. Furthermore, there is a need of a power grid that may identify one or more cascading faults. Moreover, there is a need of a self-healing power grid that may identify or predict potential power blackouts and may act appropriately to save the self-healing power grid from the potential power blackouts.

BRIEF DESCRIPTION

Embodiments of the disclosure relate generally to a power grid and more particularly to a self-healing power grid.

Briefly in accordance with one aspect of the technique, a method determining a self-healing power grid status is presented. The method includes receiving respective real-time monitoring data corresponding to one or more power grid components, wherein one or more agents are coupled to said power grid components, determining a respective current infectiousness state based upon the received real-time monitoring data, determining respective output data based upon the respective current infectiousness state, exchanging the respective output data with one or more neighboring agents, and generating a respective new infectiousness state based upon the exchanged output data and a state transition diagram.

In accordance with an aspect of the present system, a self-healing power grid is presented. The self-healing power grid includes a plurality of power grid components, a plurality of monitoring layers coupled to the power grid components, wherein the monitoring layers observe one or more real-time characteristics of the plurality of power grid components to generate respective real-time monitoring data, and a plurality of agents communicatively coupled to the monitoring layer. The one or more of the plurality of agents receive the respective real-time monitoring data corresponding to one or more power grid components, determine respective current infectiousness state based upon the received real-time data, determine respective output data based upon the respective current infectiousness state, exchange the respective output data with one or more neighboring agents, and generate respective new infectiousness state based upon the exchanged output data.

DRAWINGS

These and other features, aspects, and advantages of the present system will become better understood when the following detailed description is read with reference to the accompanying drawings in which like characters represent like parts throughout the drawings, wherein.

Figure 1:
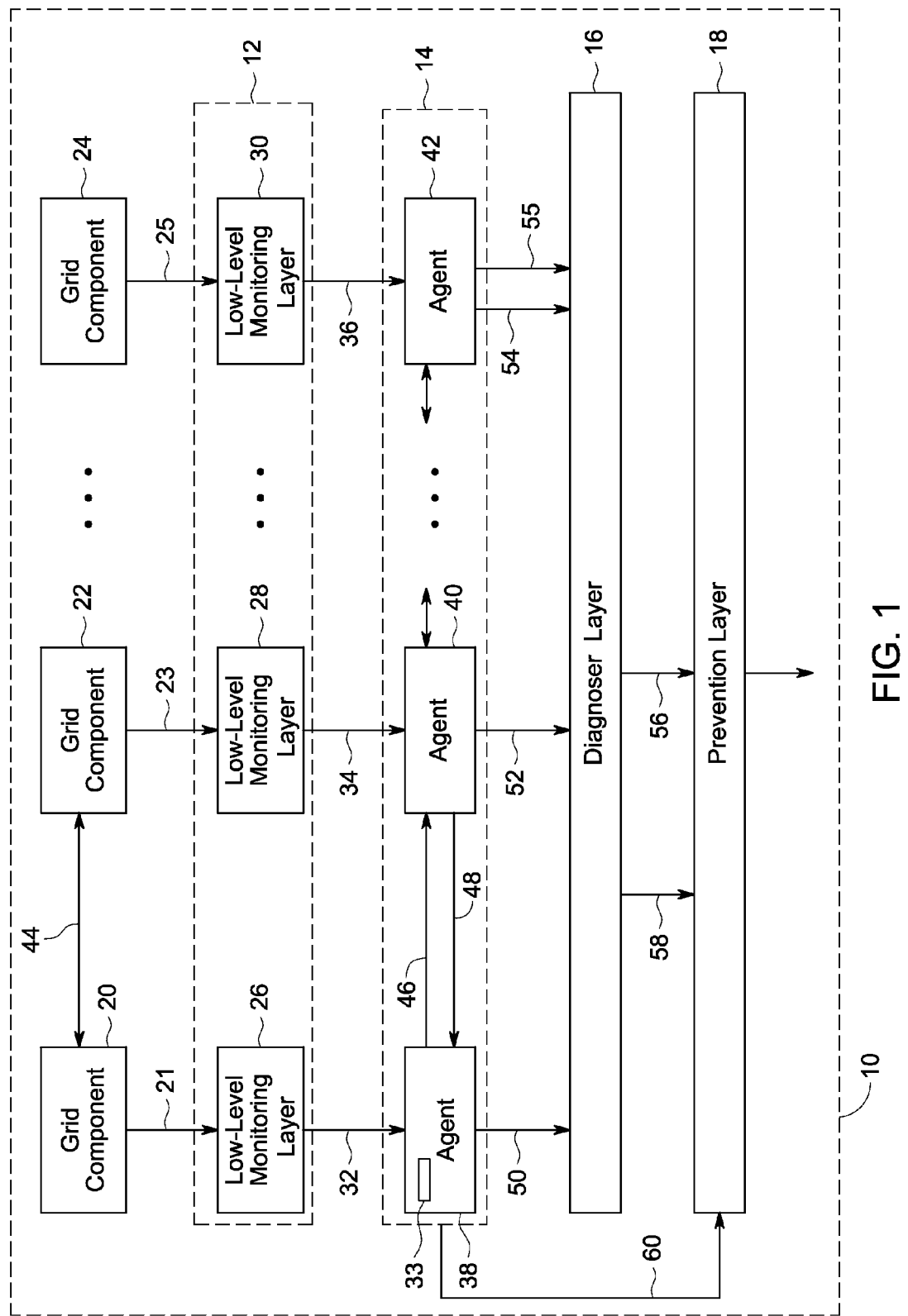
FIG. 1 is a block diagram representation of an exemplary architecture of a self-healing power grid, in accordance with aspects of the present system.
Figure 7:
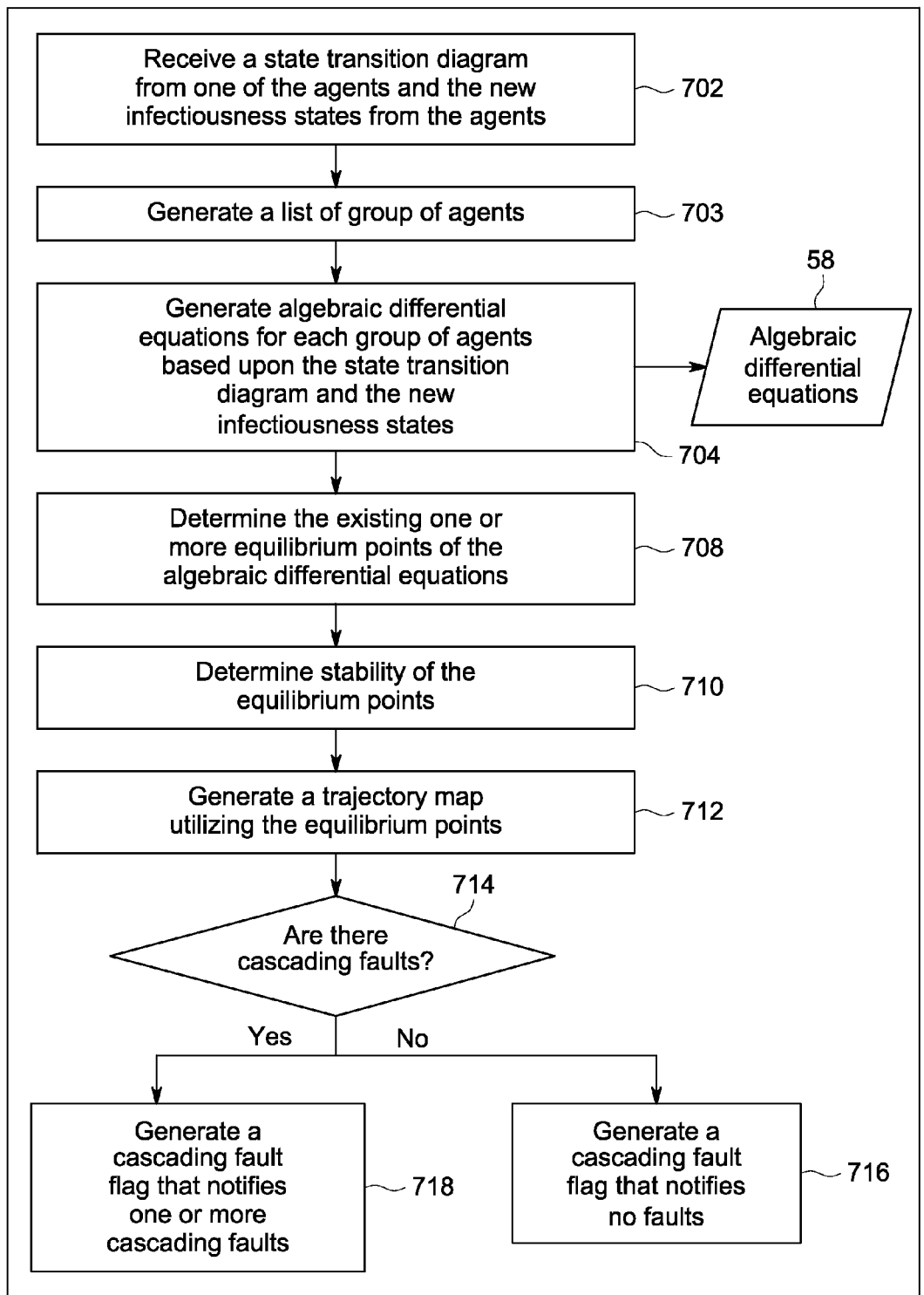
Figure 8:
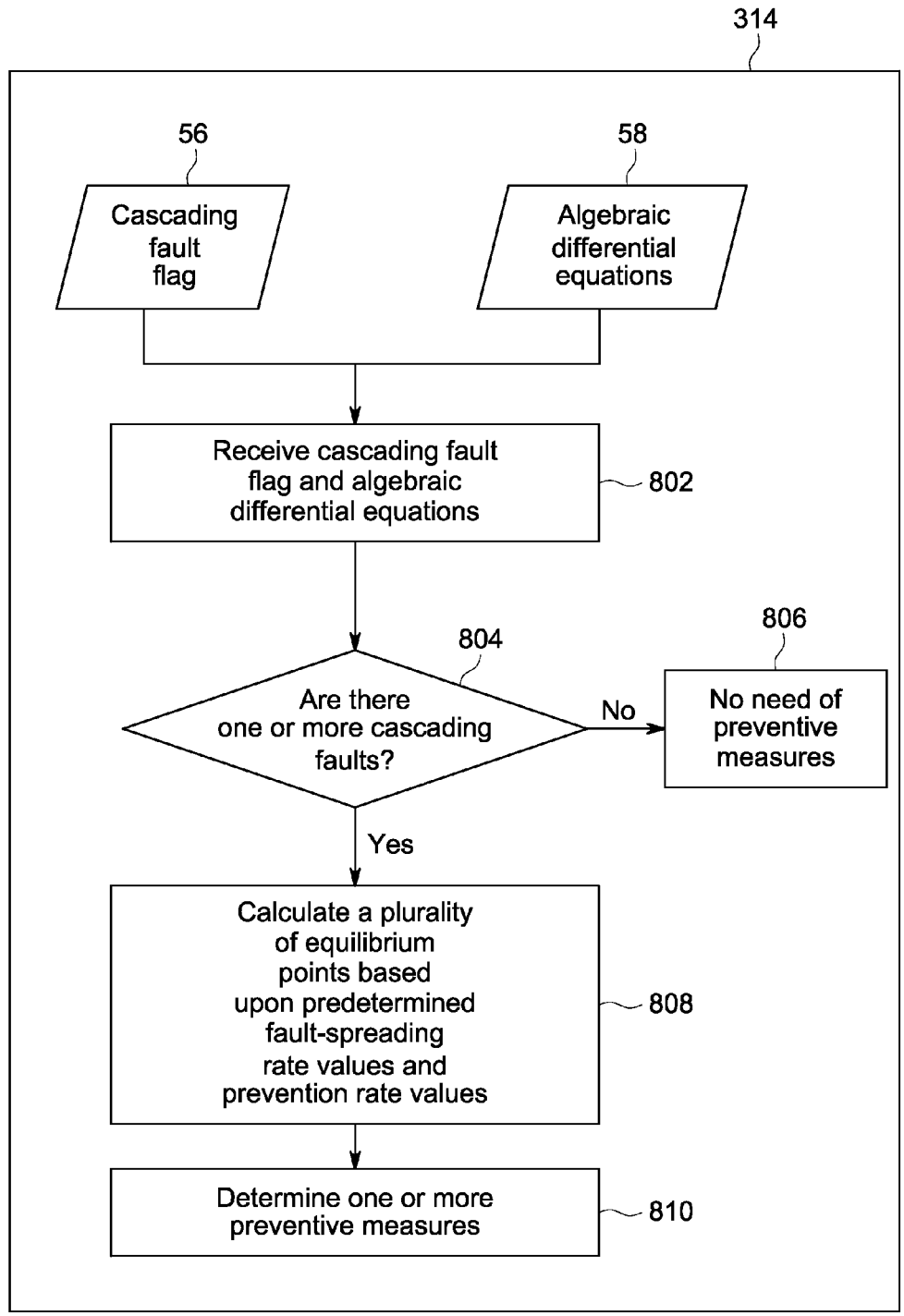

FIG. 7 is a flow chart representing an exemplary method for generating a cascading fault flag by a diagnoser layer in the self-healing power grid of FIG. 1, in accordance with aspects of the present technique; and FIG. 8 is a flow chart representing an exemplary method for determining preventive measures by a prevention layer in the self-healing power grid of FIG. 1, in accordance with aspects of the present technique.

DETAILED DESCRIPTION

As discussed in detail below, embodiments of the present techniques model a self-healing power grid analogous to human population. Accordingly, in accordance with aspects of the present techniques, the self-healing power grid has an architecture based upon the "human cognitive cycle." Furthermore, embodiments of the present system and techniques model a propagation of one or more cascading faults or failures in the self-healing power grid analogous in some respects to a propagation of infectious diseases in the human population. Therefore, the embodiments apply one or more methods that are used for detection, prevention, and containment of the infectious diseases for detection, prevention and containment of cascading faults in the self-healing power grid. Typically, random automata networks (RANs) are used for the detection, prevention and containment of the infectious diseases in the human population. Thus, embodiments of the present system or techniques apply the RANs for the detection, prevention and containment of the cascading faults in the self-healing power grid.

Referring now to FIG. 1, a block diagram representation of an exemplary architecture of a self-healing power grid 10, is depicted. As shown in the presently contemplated configuration, the architecture of the self-healing power grid 10 may include four layers 12, 14, 16, 18 for evaluating the health of the self-healing power grid 10. More particularly, the layers 12, 14, 16, 18 determine, predict, prevent and suppress one or more cascading faults or potential power blackouts in the self-healing power grid 10. The four layers 12, 14, 16, 18 include a low-level monitoring layer 12, an agents layer 14, a diagnoser layer 16 and a prevention layer 18. The four layers 12, 14, 16, 18 are similar in certain respects to the four stages of the human cognitive cycle that includes "Observe-Orient-Decide-Plan/Act" or the "OODA loop."

Furthermore, the low-level monitoring layer 12 observes certain real-time characteristics 21, 23, 25 of one or more power grid components 20, 22, 24 to generate real-time monitoring data 32, 34, 36 corresponding to the power grid components 20, 22, 24, respectively. The characteristics, for example, may include temperature, current, voltage, or the like. Further, the real-time monitoring data 32, 34, 36, for example, includes status alarms, limit violation alarms, power outages, power outage distribution factors, network topology, operational state, or the like. By way of a non-limiting example, the low-level monitoring layer 12 may include an energy management system (EMS), a system data exchange (SDX), a system control and data acquisition system (SCADA), a topology processor, or combinations thereof. Also, the power grid components 20, 22, 24, for example, may include regional transmission operators, transmission substations, distribution substations, distributed energy sources, load serving entities, generators, distribution control systems, transmission lines, distribution lines, extra high voltage system, high voltage system, medium voltage system, transformers, regional transmission organization, softwares, independent system operator, power grid organizations, energy management systems (EMS), system control and data acquisition systems (SCADA), field remote terminals (RTU), master stations, control areas, a topology processor, interchange distribution calculator, or the like. It will be appreciated by a person skilled in the art that while in the presently contemplated configuration the self-healing power grid 10 includes the three power grid components 20, 22, 24, a number of power grid components may increase based upon the network topology of the self-healing power grid 10, an expanse of the self-healing power grid 10, or the like.

As shown in FIG. 1, the low-level monitoring layer 12 may include a plurality of monitoring layers 26, 28, 30. It may be noted that a number of monitoring layers in the self-healing power grid 10 may vary and depends upon the network topology and a number of power grid components in the self-healing power grid 10. In the presently contemplated configuration, the first monitoring layer 26 observes the characteristics 21 of the first power grid component 20 for a predetermined time period to generate the first real-time monitoring data 32. The second monitoring layer 28 observes the characteristics 23 of the second power grid component 22 for the predetermined time period to generate the second real-time monitoring data 34. In addition, the third monitoring layer 30 observes the characteristics 25 of the third power grid component 24 for the predetermined time period to generate the third real-time monitoring data 36. Subsequently the low-level monitoring layer 12 may send the real-time monitoring data 32, 34, 36 to the agents layer 14.

Furthermore, the agents layer 14 includes a plurality of agents 38, 40, 42 that receives the real-time monitoring data 32, 34, 36 from the respective monitoring layers 26, 28, 30. More particularly, the agent 38 receives the first real-time monitoring data 32 from the first monitoring layer 26, the agent 40 receives the second real-time monitoring data 34 from the second monitoring layer 28 and the agent 42 receives the third real-time monitoring data 36 from the third monitoring layer 30. The agents 38, 40, 42 determine respective current infectiousness states based upon the received respective real-time monitoring data 32, 34, 36. More particularly, the agent 38 determines a respective current infectiousness state 33 based upon the received real-time monitoring data 32, the agent 40 determines a respective current infectiousness state based upon the received real-time monitoring data 34, and the agent 42 determines respective current infectiousness state based upon the received real-time monitoring data 36. As used herein, the term "infectiousness state" may be used to refer to an operational state of an agent. The infectiousness states, for example, may include a normal state, a dead state, a faulted state, a hidden faulted state, a recovered state, or the like. The term "current infectiousness state" may be used to refer to a present operational state or present infectiousness state of an agent. The determination of the respective current infectiousness states based upon the received respective real-time monitoring data 32, 34, 36 will be explained in greater detail with reference to FIG. 4.

Furthermore, the agents 38, 40, 42 determine respective output data based upon the respective current infectiousness states, such as, the respective current infectiousness state 33 of the agent 38. In the exemplary embodiment, the agent 38 determines a respective output data 46 and the agent 40 determines a respective output data 48. It may be noted that when the respective current infectiousness state of one or more of the agents 38, 40, 42 is a dead state, then the one or more of the agents 38, 40, 42 may not generate respective output data. The determination of the respective output data based upon the respective current infectiousness states, such as, the respective current infectiousness state 33 will be explained in greater detail with reference to FIG. 4.

Subsequently, the agents 38, 40, 42 exchange the respective output data with respective neighboring agents. As used herein, the term "neighboring agents" may be used to refer to at least two agents, wherein at least a power grid component corresponding to one of the agents is physically connected or operatively dependent on at least a power grid component corresponding to another agent. Hereinafter, the terms "neighboring agents" and "neighbors" will be interchangeably used. For example, as shown in FIG. 1, the agent 38 is a neighboring agent of the agent 40, since the power grid component 20 corresponding to the agent 38 is physically connected via a connection 44 to the power grid component 22 that corresponds to the agent 40. As shown in the presently contemplated configuration, the agents 38, 40 exchange respective output data 46, 48, respectively. More particularly, the agent 38 sends the respective output data 46 to the agent 40, and the agent 40 sends the respective output data 48 to the agent 38. It may be noted that though for ease of understanding, only the agents 38, 40 are shown as exchanging respective output data 46, 48, a number of agents that exchange respective output data may vary and depends upon the network topology, a number of neighboring agents, a number of power grid components in a self-healing power grid, or the like. As previously noted, one or more agents that have a respective current infectiousness state equivalent to a dead state may not generate respective output data and thus, may not exchange respective output data with respective neighboring agents.

Moreover, in certain embodiments, the agents 38, 40, 42 generate respective new infectiousness states 50, 52, 54. As used herein, the term "new infectiousness state" may be used to refer to a potential infectiousness state or potential operational state of an agent. In an exemplary embodiment, the agents 38, 40, 42 generate the respective new infectiousness states 50, 52, 54 based upon the exchanged output data. More particularly, the agents 38, 40, 42 may generate the respective new infectiousness states 50, 52, 54 based upon the output data that is received from the respective neighboring agents, a state transition diagram 55, the respective current infectiousness states, the respective real-time monitoring data 32, 34, 36 and one or more parameters 60. In an exemplary embodiment, the state transition diagram 55 may be stored in a data repository of one or more of the agents 38, 40, 42. An exemplary state transition diagram 55 will be shown in FIG. 6. Further, the one or more parameters 60, for example, may include a power grid component removal rate, a fault spreading parameter, an observation probability, or the like. The one or more parameters 60, for example, may be generated based upon an expert's knowledge, a power flow analysis, one or more statistical methods, or the like. The generation of the respective new infectiousness states 50, 52, 54 will be described in greater detail with reference to FIG. 5.

In certain embodiments, the agents 38, 40, 42 transmit the respective new infectiousness states 50, 52, 54 to the diagnoser layer 16. In a particular embodiment, one of the agents 38, 40, 42 also transmits the state transition diagram 55. The diagnoser layer 16 determines one or more cascading faults in the self-healing power grid 10 based upon the received new infectiousness states 50, 52, 54 and the state transition diagram 55. In one embodiment, the diagnoser layer 16 determines the one or more cascading faults by generating one or more algebraic differential equations 58 and processing the algebraic differential equations 58 to determine one or more equilibrium points. The generation of the one or more algebraic differential equations 58 and the processing of the one or more algebraic differential equations 58 to determine the one or more cascading faults will be explained in greater detail with reference to FIG. 7.

Furthermore, the diagnoser layer 16 generates a cascading fault flag 56 based upon the determination of the one or more cascading faults. As used herein, the term "cascading fault flag" may be used to refer to a value that identifies one or more cascading faults in a self-healing power grid. In one embodiment, the cascading fault flag 56 may have a value equal to '0' that indicates no cascading fault in the self-healing power grid 10. In another embodiment, the cascading fault flag 56 may have a value equal to '1' that indicates one or more cascading faults in the self-healing power grid 10. Further, in one embodiment, the diagnoser layer 16 may generate a single cascading fault flag corresponding to one or more cascading faults in the self-healing powered grid 10. In another embodiment, the diagnoser layer 16 may generate multiple cascading fault flags corresponding to multiple cascading faults in the self-healing power grid 10. By way of a non-limiting example, the diagnoser layer 16 may include one or more routines, a microprocessor, a computer, one or more programs, or the like. The determination of the one or more cascading faults and the generation of a cascading fault flag will be described in greater detail with reference to FIG. 7.

Moreover, the prevention layer 18 receives the cascading fault flag 56 and the one or more algebraic differential equations 58 from the diagnoser layer 16. In addition, the prevention layer 18 receives the one or more parameters 60 from the agents layer 14. By way of a non-limiting example, the prevention layer 18 includes one or more routines, a microprocessor, a computer, one or more programs, or the like. The prevention layer 18 may determine one or more preventive measures based upon the cascading fault flag 56. More particularly, the prevention layer 18 may determine the one or more preventive measures when the cascading fault flag 56 indicates one or more cascading faults in the self-healing power grid 10. In one embodiment, the prevention layer 18 may determine the one or more preventive measures utilizing the algebraic differential equations 58 and the one or more parameters 60. As used herein, the term "preventive measures" may be used to refer to one or more steps that may prevent the self-healing power grid 10 from potential power blackouts that may occur due to one or more cascading faults determined by the diagnoser layer 16. More particularly, the preventive measures may be one or more steps that may vary a prevention rate and a fault-spreading rate to prevent the self-healing power grid 10 from the potential power blackouts. The preventive measures, for example, may include an automatic load-shedding, a controlled islanding, changes in the topology, a rewiring the agents layer 14, or the like.

Furthermore, in certain embodiments, the agents 38, 40, 42 may update the respective current infectiousness state by equating the respective new infectiousness state to the respective current infectiousness state. For example, when the new infectiousness state of the agent 38 is a faulted state, then the current infectiousness state 33 of the agent 38 is equated to the faulted state. Subsequent to the updation of the respective current infectiousness state, the agents 38, 40, 42 may determine respective updated output data based upon the current infectiousness state. In addition, the agents 38, 40, 42 may exchange the updated output data with respective neighboring agents. Subsequent to the exchange of the updated output data, respective new infectiousness states may be determined by the agents 38, 40, 42. The determination of the respective updated output data will be explained in greater detail with reference to FIG. 4.

Figure 2:
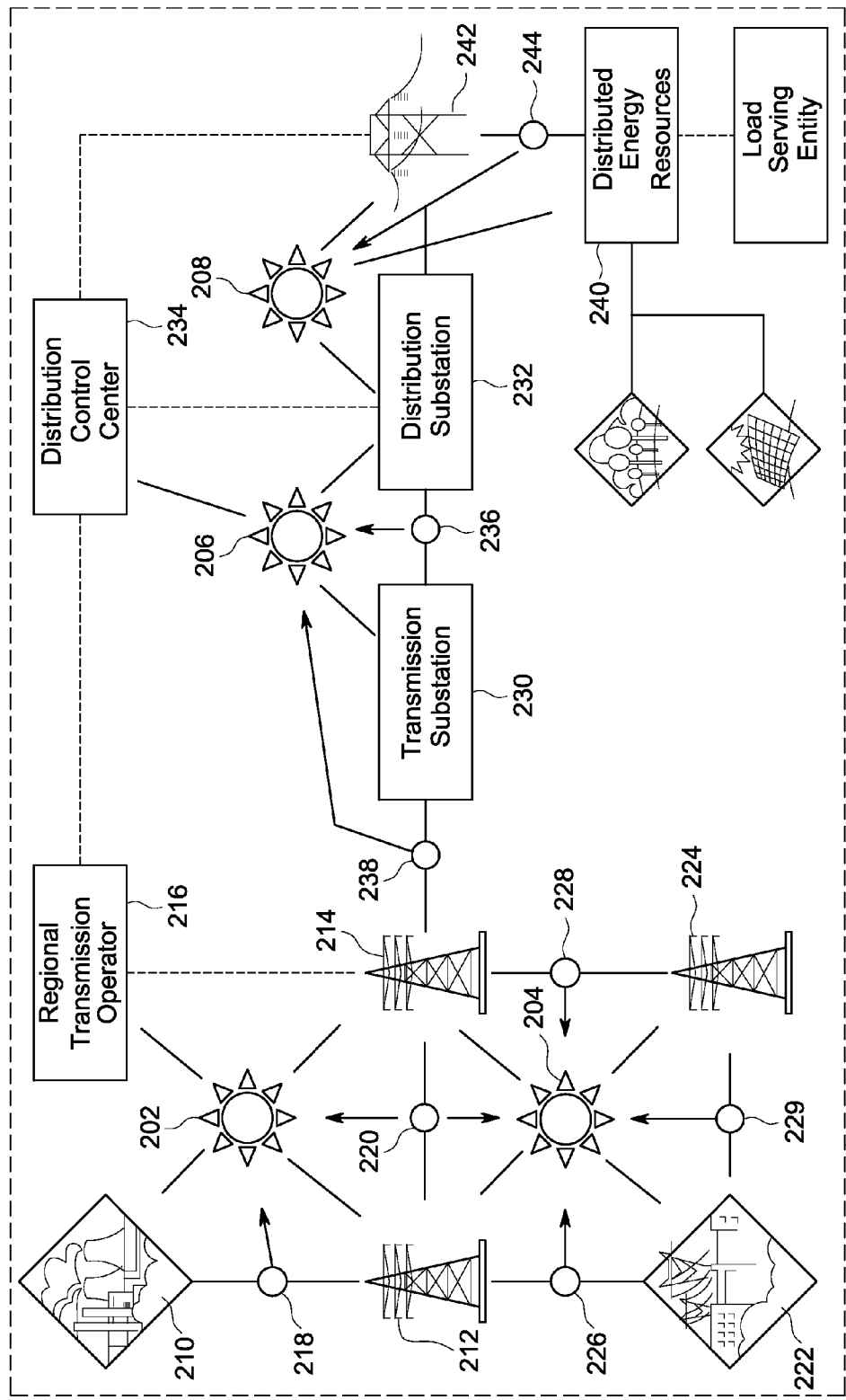
FIG. 2 is a diagrammatic illustration of an exemplary self-healing power grid that shows positioning of a plurality of agents in the self-healing power grid, in accordance with aspects of the present system.

Referring now to FIG. 2 is a diagrammatic illustration of an exemplary portion of the self-healing power grid 100 that shows exemplary positioning of a plurality of agents 202, 204, 206, 208. The agents 202, 204, 206, 208, for example, may be similar to one or more of the agents 38, 40, 42 (see FIG. 1). It should be noted that while in the presently contemplated configuration the self-healing power grid 100 includes four agents 202, 204, 206, 208, a number of agents varies based upon the network topology, size, expanse of the self-healing power grid 100, or the like. As shown in the exemplary embodiment, the agent 202 corresponds to power grid components including a generator 210, transmission systems 212, 214 and a regional transmission operator 216. More particularly, the agent 202 receives real-time monitoring data, such as, the real-time monitoring data 32, 34, 36 (see FIG. 1) corresponding to the power grid components 210, 212, 214, 216. As previously noted, the agent 202 may receive the real-time monitoring data via monitoring layers 218, 220.

Similarly, in the exemplary embodiment, the agent 204 corresponds to power grid components including transmission systems 212, 214, 224 and a generator 222 and receives real time monitoring data corresponding to the power grid components 212, 214, 222, 224 via monitoring layers 220, 226, 228, 229. Furthermore, the agent 206 corresponds to the power grid components including a transmission substation 230, a distribution substation 232 and a distribution control centre 234. In addition, the agent 206 receives the real-time monitoring data corresponding to the power grid components 230, 232, 234 via monitoring layers 236, 238. Similarly, the agent 208 corresponds to power grid components including the distribution substation 232, distributed energy resources 240 and a transmission system 242. The agent 208 receives real-time monitoring data corresponding to the power grid components 232, 240, 242 via a monitoring layer 244.

As previously noted with reference to FIG. 1, the agents 202, 204, 206, 208 determine respective current infectiousness states and generate respective new infectiousness states. The determination of respective current infectiousness states will be described in greater detail with reference to FIG. 3. In addition, the generation of the respective new infectiousness states will be described in greater detail with reference to FIG. 5.

Figure 3:
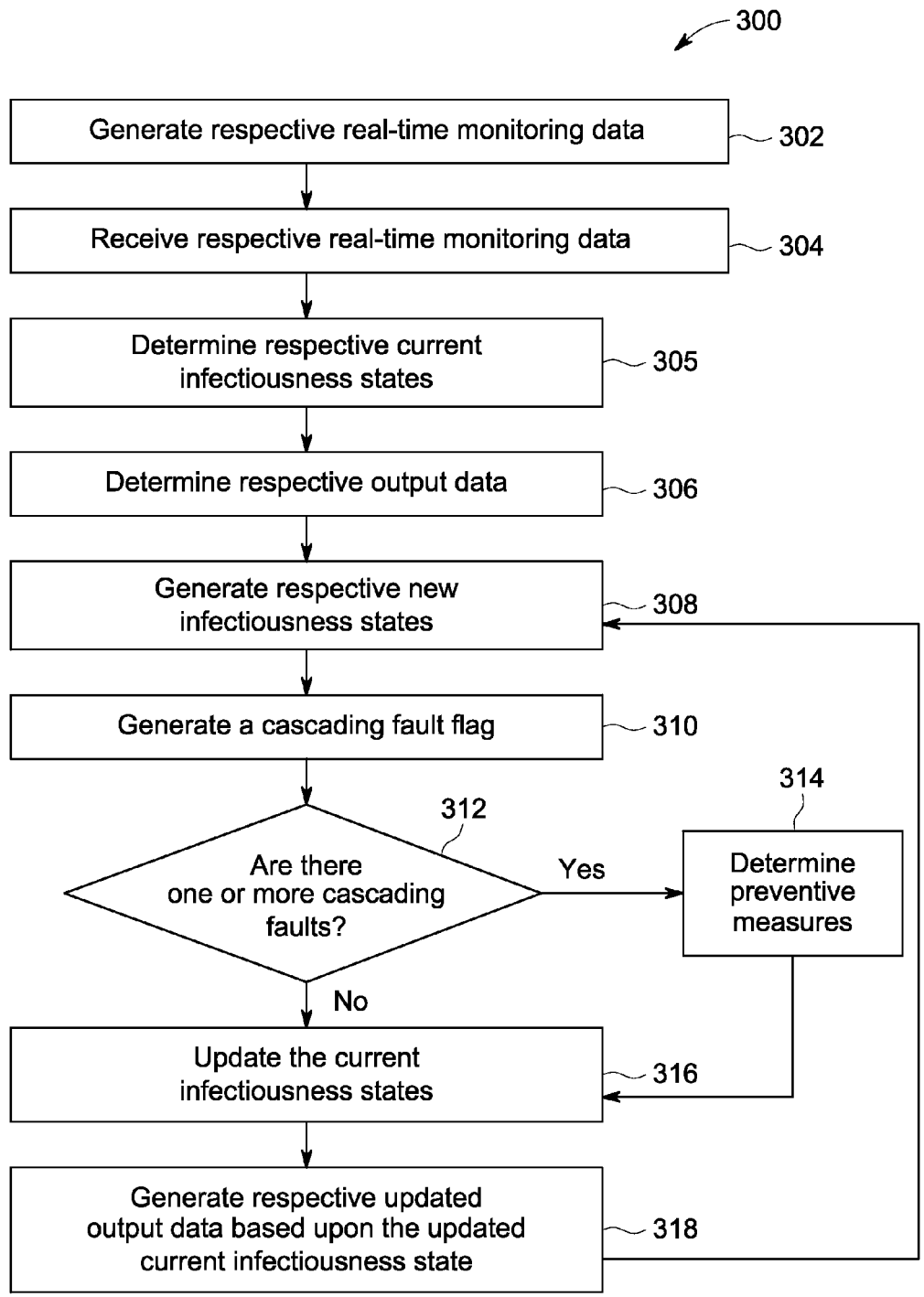
FIG. 3 is a flow chart representing an exemplary method for determining one or more cascading faults in the self-healing power grid of FIG. 1, in accordance with aspects of the present technique.

Referring now to FIG. 3 is a flow chart representing an exemplary method 300 for determining one or more cascading faults in the self-healing power grid 10 (see FIG. 1) and determining one or more preventive measures based upon the one or more cascading faults. The method starts at step 302 where respective real-time monitoring data is generated by a plurality of monitoring layers. As previously noted, the real-time monitoring data, for example, includes status alarms, limit violation alarms, power outages, power outage distribution factors, network topology, operational state, or the like. The plurality of monitoring layers, for example, may be the monitoring layers 26, 28, 30 (see FIG. 1). The respective real-time monitoring data may be generated by the monitoring layers by observing real-time characteristics, such as, voltages, temperatures and current of respective one or more power grid components. The power grid components, for example, may be the power grid components 20, 22, 24. In addition, the real-time monitoring data, for example, may be the real-time monitoring data 32, 34, 36 (see FIG. 1). Also, the real-time characteristics, for example, may be the real-time characteristics 21, 23, 25 (see FIG. 1).

Furthermore, at step 304, the plurality of agents receives respective real-time monitoring data from respective monitoring layers. For example, as shown in FIG. 1, the agent 38 receives respective real-time monitoring data 32 from the respective monitoring layer 26, the agent 40 receives the respective real-time monitoring data 34 from the respective monitoring layer 28 and the agent 42 receives the respective real-time monitoring data 36 from the respective monitoring layer 30. As shown in FIG. 3, at step 305, the plurality of agents may determine respective current infectiousness states. As used herein, the term "current infectiousness state" may be used to refer to present infectiousness state of an agent or a present operational state of an agent. The current infectiousness states may include a dead state, a normal state, a faulted state, a hidden faulted state, a recovered state, or the like. The plurality of agents may determine respective current infectiousness states based upon the received respective real-time monitoring data. For example, as shown in FIG. 1, the agent 38 determines the respective current infectiousness state 33 based upon the respective real time monitoring data 32, the agent 40 determines the respective current infectiousness state based upon the real time monitoring data 34 and the agent 42 determines the respective current infectiousness state based upon the real-time monitoring data 36.

For ease of understanding, the step 305 will be explained for determining the respective current infectiousness state 33 by the agent 38 of FIG. 1. However, the step 305 may be used by any agent within the scope of the present system and techniques for determining respective current infectiousness state. The determination of the respective current infectiousness state 33 may be understood in greater detail with reference to Table 1 as shown below.

TABLE 1

| Operational state of power grid component based upon received real-time monitoring data | Limit Violation Alarm corresponding to the power grid component based upon received real-time monitoring data | Current Infectiousness State |
| --- | --- | --- |
| Non operational | NO | Dead (D) |
| Non operational | YES | Dead (D) |
| Operational | NO | Normal (N) |
| Operational | YES | Faulted (F) |
| UNKNOWN | UNKNOWN | Normal (N) with probability q or Hidden Faulted (H) with probability (1 − q) |

As shown in Table 1, when the received real-time monitoring data 32 identifies the corresponding power grid component 20 in a non-operational state and no limit violation alarms corresponding to the power grid component 20, then the respective current infectiousness state 33 of the agent 38 is a dead state. In addition, when the real-time monitoring data 32 identifies the corresponding power grid component 20 as not operational and a limit violation alarm being generated corresponding to the power grid component 20, then the current infectiousness state 33 of the agent 38 is a dead state. Also, when the real-time monitoring data 32 identifies the corresponding power grid component 20 as operational and no limit violation alarms corresponding to the power grid component 20, then the current infectiousness state 33 of the agent 38 is a normal state. Furthermore, when the real-time monitoring data 32 identifies the corresponding power grid component 20 as operational and one or more limit violation alarms corresponding to the power grid component 20, then the current infectiousness state 33 of the agent 38 is a faulted state. Similarly, when the real-time monitoring data 32 does not have information related to the operational state and limit violation alarms corresponding to the power grid component 20, then the current infectiousness state 33 of the agent 38 is a normal state with a probability q or a hidden faulted state with a probability (1−q), where q is an observation probability. In a particular embodiment, when there is no monitoring mechanism to evaluate the operational state and the limit violation alarms corresponding to the power grid component 20, then the current infectiousness state 33 of the agent 38 is a hidden faulted state.

Subsequently, at step 306, one or more of the agents determine a respective output data. The determination of the respective output data by an agent will be explained in greater detail with reference to FIG. 4. At step 308, the one or more of the agents generate respective new infectiousness states. As previously noted, the term "new infectiousness state" may be used to refer to a potential infectiousness state of an agent. The new infectiousness states, for example, may include a normal state, a hidden faulted state, a faulted state, a disconnected state, a recovered state, or the like. The generation of a respective new infectiousness state will be explained in greater detail with reference to FIG. 5.

Subsequent to the generation of the respective new infectiousness states by one or more of the agents at step 308, the cascading fault flag 56 (see FIG. 1) may be generated by the diagnoser layer 16 at step 310. As used herein, the term "cascading fault flag" may be used to refer to a value that identifies one or more cascading faults in a self-healing power grid. In one embodiment, the diagnoser layer 16 may generate the cascading fault flag 56 based upon one or more cascading faults in the self-healing power grid 10. The one or more cascading faults, for example, may be determined based upon the new infectiousness states and the state transition diagram 55. The generation of a cascading fault flag will be explained in greater detail with reference to FIG. 7.

Furthermore, at step 312, a check may be carried out to verify an existence of one or more cascading faults. The check may be carried out based upon the cascading fault flag generated by the diagnoser layer 16. The check, for example, may be carried out by the prevention layer 18. Accordingly, at the step 312 when the cascading fault flag 56 indicates an existence of the cascading faults, then the control may be transferred to step 314. At step 314, one or more preventive measures may be determined by the prevention layer 18. By way of a non-limiting example, the preventive measures may include an automatic load-shedding, a controlled islanding, changes in the topology, rewiring the agents layer 14, or the like. The determination of the preventive measures will be explained in greater detail with reference to FIG. 8.

However, when the cascading fault flag 56 does not indicate an existence of the cascading faults, then the control may be transferred to step 316. At step 316, the respective current infectiousness states of the agents may be updated. The respective current infectiousness states may be updated by equating the respective new infectiousness states of the agents to the respective current infectiousness states. For example, if the new infectiousness state of an agent is a faulted state, then a current infectiousness state of the agent is equated to the faulted state. It may be noted that the equation of the respective new infectiousness states to the respective current infectiousness states indicates a change in operational states of the agents. Furthermore, at step 318, respective updated output data may be generated based upon the respective current infectiousness states by the agents. The generation of an updated output data based upon a respective current infectiousness state by an agent will be explained in greater detail with reference to FIG. 4. Subsequent to the generation of the respective updated output data by the agents, the control may be transferred to the step 308 where respective new infectiousness states may be generated by the agents. Thus, the steps 308 to 312 are typically repeated.

Figure 4:
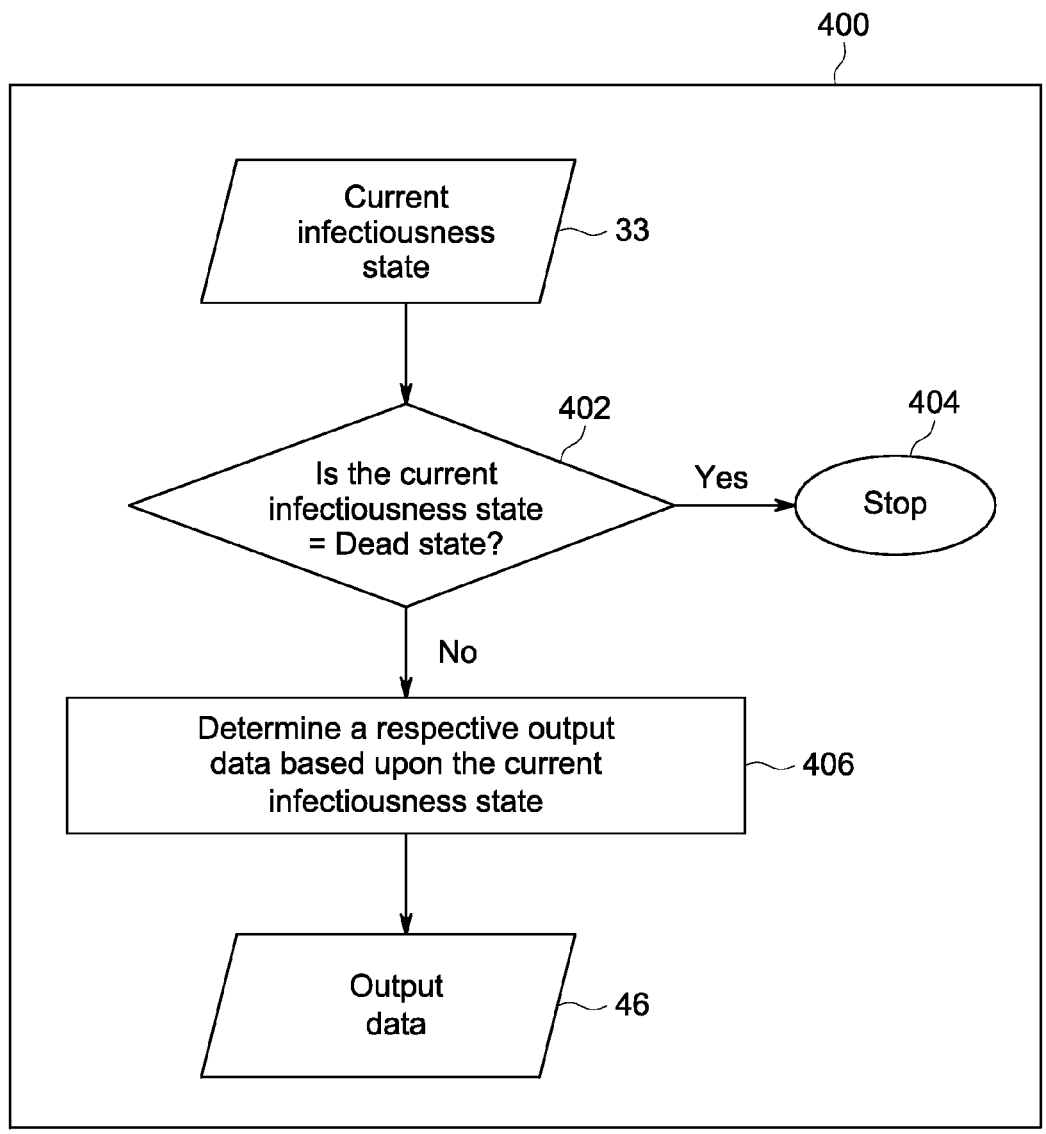
FIG. 4 is a flow chart representing an exemplary method for determining respective output data by an agent in the self-healing power grid of FIG. 1, in accordance with aspects of the present technique.

FIG. 4 is a flow chart illustrating an exemplary process 400 for determining respective output data by an agent. More particularly, the process 400 describes processing of step 306 and step 318 of FIG. 3 in greater detail. For ease of understanding, FIG. 4 will be explained for determining the respective output data 46 by the agent 38 of FIG. 1. However, FIG. 4 may be used by any agent within the scope of the present system and techniques for determining respective output data.

As shown in FIG. 4, reference numeral 33 is representative of a current infectiousness state of the agent 38. The current infectiousness state 33, for example, may include the current infectiousness state determined at step 305 of FIG. 3 or the current infectiousness state updated at step 316 of FIG. 3. As previously noted, the current infectiousness state 33 may include a dead state, a normal state, a faulted state, a hidden faulted state, a recovered state, or the like.

Furthermore, at step 402, a check is carried out to verify if the respective current infectiousness state 33 of the agent 38 is a dead state. At step 402, if it is determined that the respective current infectiousness state 33 of the agent 38 is a dead state, then the control is transferred to step 404. At step 404, the agent 38 may not determine the respective output data 46 (see FIG. 1). However, at step 402, if it is determined that the current infectiousness state 33 of the agent 38 is not a dead state, then the control may be transferred to step 406. At step 406, the agent 38 may determine the respective output data 46 based upon the respective current infectiousness state 33. The determination of the respective output data 46 based upon the respective current infectiousness state 33 may be understood in greater detail with reference to Table 2 as shown below.

TABLE 2

| Current infectiousness state | Output data/Updated output data |
|---|---|
| Normal (N) or Recovered | 0 |
| Fault (F) | $(1 - \beta)$ |
| Hidden Faulty (H) | 1 |

As shown in Table 2, when the respective current infectiousness state 33 of the agent 38 is a normal state or a recovered state, then the respective output data 46 of the agent 38 is '0.' In addition, when the respective current infectiousness state 33 of the agent 38 is a faulted state, then the respective output data 46 of the agent 38 is '$1-\beta$,' where $\beta$ is a prevention rate. The prevention rate in one example is a design parameter that is dependent on the corresponding power grid component 20 of the agent 38 and the likelihood of individual operators or automated control algorithms to prevent the power grid component 20 from being in a faulted state. Furthermore, when the current infectiousness state 33 of the agent 38 is a hidden faulted state, then the output data 46 corresponding to the agent 38 is '1'.

Figure 5:
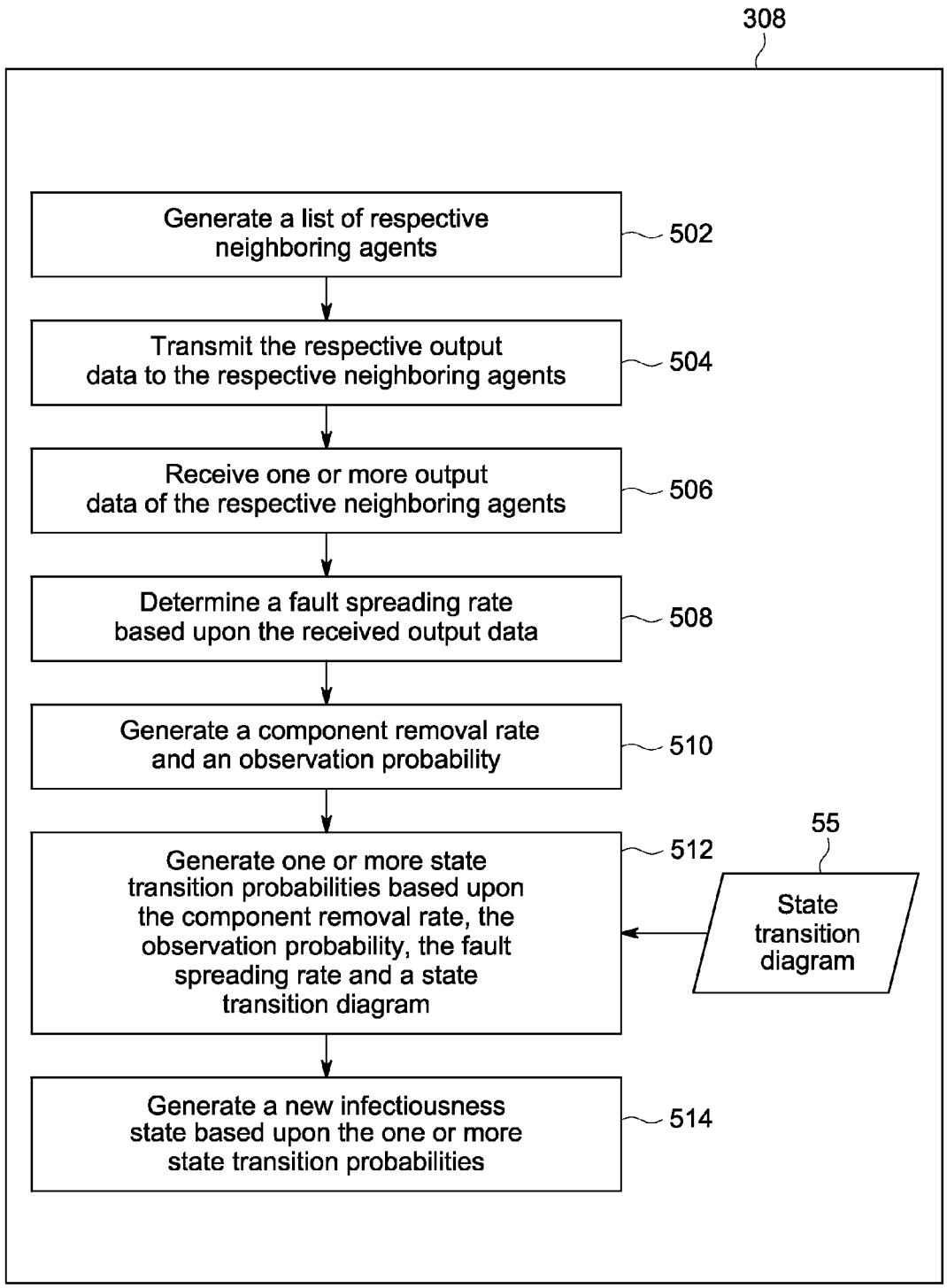
FIG. 5 is a flow chart representing an exemplary method for generation of a respective new infectiousness state by an agent in the self-healing power grid of FIG. 1.

Turning now to FIG. 5, a flow chart representing an exemplary method 308 for generation of a respective new infectiousness state by an agent in the self-healing power grid 10, is depicted. More particularly, step 308 of FIG. 3 is described in greater detail. It may be noted that for ease of understanding the method 308 describes generation of the respective new infectiousness state 50 by the agent 38 in the self-healing power grid 10 of FIG. 1. However, the method 308 may be used by any agent, such as, the agents 38, 40, 42, 202, 204, 206, 208 within the scope of the present system and techniques for generation of respective new infectiousness state.

The method continues at step 502, where a list of respective neighboring agents may be generated by the agent 38. The list of neighboring agents, for example, may be generated based upon the network topology of the self-healing power grid 10. As previously noted, the term "neighboring agents" may be used to refer to at least two agents, wherein at least a power grid component corresponding to one of the agents is physically connected or operatively dependent on at least a power grid component corresponding to another agent. The list of respective neighboring agents may include one or more unique identification of neighboring agents of the agent 38.

Hereinafter, the terms "neighboring agents" and "neighbors" will be used interchangeably used. By way of a non-limiting example, the agent 38 may determine the list of neighbors based upon the network topology in the real-time monitoring data 32. As previously noted with reference to FIG. 1, the agent 38 determines the agent 40 as a neighbor since the respective power grid component 20 of the agent 38 is physically connected to the respective power grid component 22 of the agent 40.

Furthermore, at step 504, the agent 38 transmits the respective output data 46 to the agent 40 that is the neighbor of the agent 38. In addition, at step 506, the agent 38 receives the respective output data 48 of the agent 40. In certain embodiments, the agent 38 may determine one or more parameters 60 (see FIG. 1) at steps 508 and 510. As previously noted with reference to FIG. 1, the one or more parameters may include a fault spreading rate, a power grid component removal rate, an observation probability, or the like. At step 508, the agent 38 determines the fault spreading rate of the respective power grid component 20 based upon the received output data 48 of the agent 40. By way of an exemplary embodiment, the fault spreading rate may be represented as shown in equation (1):

$$\delta = \frac{L_m + \frac{1}{|N_m| - |\{z_i = 0 \text{ and } iEN_m\}|}\sum_{iEN_m} z_i L_i}{L_m + \sum_{iEN_m} L_i} \quad (1)$$

where $L_i$ is the current load of a power grid component i, $N_m$ denotes neighbors of an agent m, $|N_m| - |\{z_i=0 \text{ and } iEN_m\}|$ is the number of non-operational power grid components, $\Sigma_{iEN_m} z_i L_i$ is the total current load on the non-operational power grid components that needs to be transferred, and $\Sigma_{iEN_m} L_i$ is the total load on the nearest power grid components. It may be noted from the equation (1) that the fault spreading rate determined by an agent is dependent on the output data received from neighbors of an agent.

Furthermore, at step 510, the power grid component removal rate and the observation probability may be determined by the agent 38. In one embodiment, the power grid component removal rate and the observation probability may be determined based upon an expert's knowledge. In another embodiment, the power grid component removal rate and the observation probability may be determined based upon power flow analysis. In still another embodiment, the power grid component removal rate and the observation probability may be determined based upon one or more statistical methods based upon historical data. In certain embodiments, the power grid component removal rate may be an average or a mean of power grid component removal rates corresponding to one or more power grid components.

Subsequently, at step 512, one or more state transition probabilities may be determined by the agent 38 based upon the power grid component removal rate, the observation probability, the fault spreading rate and the state transition diagram 55 (see FIG. 1). As used herein, the term "state transition probability" may be used to refer to a probability of an agent to transition from a current infectiousness state to another infectiousness state or retaining the current infectiousness state. The determination of one or more state transition probabilities from a current infectiousness state will be explained in greater detail with reference to FIG. 6.

Furthermore, at step 514, the new infectiousness state 50 may be generated by the agent 38 based upon one or more of the state transition probabilities determined at step 512. In an exemplary embodiment when a current infectiousness state of an agent is $x_0$, then a new infectiousness state may be $x_i$ when the following condition is satisfied:

$$\sum_{m=1}^{i-1} v_i < RV \le \sum_{m=1}^{i} v_i \quad (2)$$

where $v_i$ is a state transition probability from the current infectiousness state $x_0$, to $x_i$, i=1, 2, ... n and n is a total number of state transition probabilities to the other infectiousness states from the current infectiousness state $x_0$.

Figure 6:
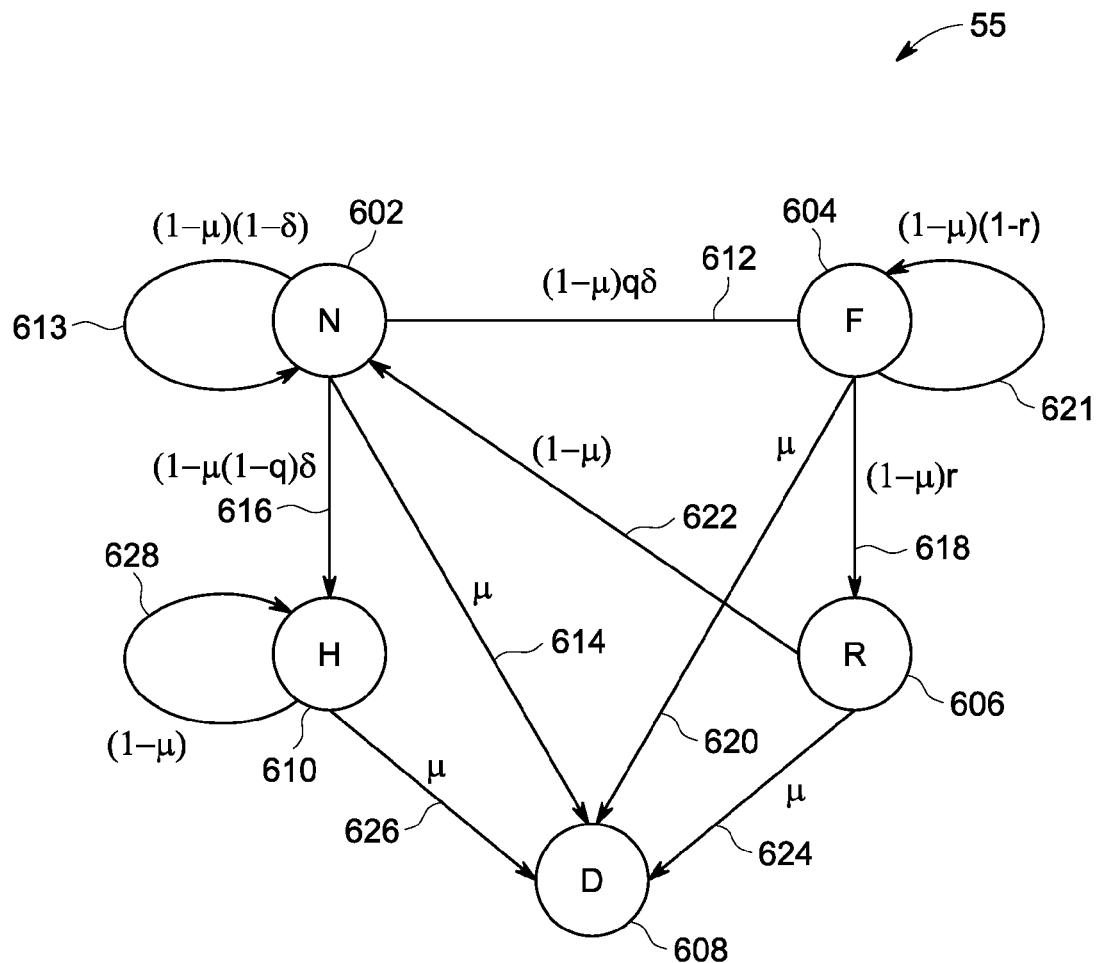
FIG. 6 is an exemplary state transition diagram for determining state transition probabilities of an agent in the self-healing power grid of FIG. 1, in accordance with aspects of the present technique.

Referring now to FIG. 6, an exemplary state transition diagram 55 for determining state transition probabilities of an agent to transition to other infectiousness states, is depicted. More particularly, FIG. 6 describes step 512 of FIG. 5. Reference numerals 602, 604, 606, 608, 610 may be representative of an infectiousness state, a current infectiousness state or an updated current infectiousness state of an agent, such as, the agents 38, 40, 42, 202, 204, 206, 208. As shown in FIG. 6, reference numeral 602 is representative of a normal state, reference numeral 604 is representative of a faulted state, reference numeral 606 is representative of a recovered state, reference numeral 608 is representative of a disconnected state and reference numeral 610 is representative of a hidden faulted state. As shown in the state transition diagram 55, when a current infectiousness state of an agent, such as, the agent 38 is the normal state 602, then the agent 38 may transition to four other infectiousness states including the normal state 602, the faulted state 604, the disconnected state 608 or the hidden faulted state 610.

In one embodiment, when the current infectiousness state or an updated current infectiousness state of an agent is a normal state 602, then a state transition probability 612 from the normal state 602 to the faulted state 604 may be determined by the following equation (3):

$$P_{NF}=(1-\mu)q\delta \quad (3)$$

where $P_{NF}$ is a state transition probability from a normal state to a faulted state, $\mu$ is a probability of a power grid component removal rate or a power grid component becoming non-operational, q is an observation probability, and $\delta$ is a fault spreading rate. Furthermore, a state transition probability 614 from the normal state 602 to the disconnected state 608 may be determined by the following equation (4):

$$P_{ND}=\mu \quad (4)$$

where $P_{ND}$ is a state transition probability from a normal state to a disconnected state and $\mu$ is a probability of a power grid component becoming non-operational. Moreover, a state transition probability 616 from the normal state 602 to the hidden faulted state 610 may be determined by the following equation (5):

$$P_{NH}=(1-\mu)(1-q)\delta \quad (5)$$

where $P_{NH}$ is a state transition probability from a normal state to a hidden faulted state, $\mu$ is a probability of a power grid component becoming non-operational, q is an observation probability, and $\delta$ is a fault spreading rate.

In addition, a state transition probability 613 for an agent to retain the normal state 602 may be determined by the following equation (6):

$$P_{NN}=(1-\mu)(1-\delta) \quad (6)$$

where $P_{NN}$ is a state transition probability of an agent for retaining a normal state, µ is a probability of a power grid component to become non-operational and δ is a fault spreading rate.

In certain embodiments, when a current infectiousness state or an updated current infectiousness state of an agent is the faulted state 604, then the agent may transition to three infectiousness states including the recovered state 606, the disconnected state 608 or retaining the faulted state 604. In one embodiment, a state transition probability 618 from the faulted state 604 to the recovered state 606, may be determined by the following equation (7):

$$P_{FR}=(1-\mu)r \quad (7)$$

where $P_{FR}$ is a state transition probability from a faulted state to a recovered state, µ is a probability of a power grid component becoming non-operational and r is a recovery rate. The recovery rate, for example, may depend upon remedial measures taken by automated control algorithms or manual actions taken by system operators and an ability of the power grid component to withstand and recover from intermittent faults. Similarly, a state transition probability 620 from the faulted state 604 to the disconnected state 608 may be determined by the following equation (8):

$$P_{FD}=\mu \quad (8)$$

where $P_{FD}$ is a state transition probability from a faulted state to a disconnected state and µ is a probability of a power grid component becoming non-operational. In one embodiment, a state transition probability 621 for an agent to retain the faulted state 604 may be represented by the following equation (9):

$$P_{FF}=(1-\mu)(1-r) \quad (9)$$

where $P_{FF}$ is a state transition probability for an agent to retain a faulted state and r is a recovery rate. Also, when a current infectiousness state or an updated current infectiousness state of an agent is the recovered state, then the agent may transition to two infectiousness states including the normal state 602 and the disconnected state 608. As shown in FIG. 6, a state transition probability 622 from the recovered state 606 to the normal state 602 may be determined by the following equation (10):

$$P_{RN}=(1-\mu) \quad (10)$$

where $P_{RN}$ is a state transition probability from a recovered state to a normal state and µ is a probability of a power grid component to become non-operational. Similarly, a state transition probability 624 from the recovered state 606 to the disconnected state 608 may be determined by the following equation (11):

$$P_{RD}=\mu \quad (11)$$

where $P_{RD}$ is a state transition probability from a recovered state to a disconnected state and µ is a probability of a power grid component to become non-operational. Furthermore, a state transition probability 626 of the agent for a transition from the hidden faulted state 610 to the disconnected state 608 may be determined by the following equation (12):

$$P_{HD}=\mu \quad (12)$$

where $P_{HD}$ is a state transition probability from a hidden faulted state to a disconnected state and µ is a probability of a power grid component to become non-operational. In one embodiment, a state transition probability 628 for an agent to retain the hidden faulted state 610 may be represented by the following equation (13):

$$P_{HD}=(1-\mu) \quad (13)$$

It may be noted that while in the presently contemplated state transition diagram 55, there are five infectiousness states 602, 604, 606, 608, 610, and eleven state transition probabilities 612, 613, 614, 616, 618, 620, 621, 622, 624, 626, 628, a number of infectiousness states and a number of state transition probabilities may vary based upon network topology, or the like.

FIG. 7 is a flow chart representing an exemplary method 310 for generating a cascading fault flag. More particularly, the process describes step 310 for generating the cascading fault flag 56 by the diagnoser layer 16 (see FIG. 1). As previously noted, the term "cascading fault flag" may be used to refer to a value that identifies one or more cascading faults in a self-healing power grid. The method starts at step 702 where the state transition diagram 55 may be received by the diagnoser layer 16. The state transition diagram 55, for example, may be received from an agent, such as, the agents 38, 40, 42. Furthermore, at step 702, the diagnoser layer 16 receives new infectiousness states, such as, the new infectiousness states 50, 52, 54 of the agents 38, 40, 42.

As shown in FIG. 7, at step 703, the diagnoser layer 16 may generate a list of group of agents, such as, the agents 38, 40, 42. In one embodiment, each group of agents includes agents that have a similar number of neighbors. Furthermore, at step 704, one or more algebraic differential equations 58 may be generated based upon the state transition diagram 55 and the new infectiousness states 50, 52, 54. In one embodiment, the algebraic differential equations 58 are generated such that there is an algebraic differential equation for each group of agents in the list and for each of the new infectiousness states 50, 52, 54. The algebraic differential equations 58 corresponding to a group of agents wherein each of the agents have k neighbors and a new infectiousness state S, for example, may be generated utilizing the following equation (14):

$$\dot{x}_{S,k} = \sum_{Input\ arcs} v_{i,k} x_{i,k} - \sum_{Output\ arcs} v_{j,k} x_{j,k} \quad (14)$$

where $\dot{x}_{S,k}$ is a change in a number of agents that have a new infectiousness state S and have k neighbors, $v_{i,k}$ is a state transition probability for an infectiousness state i to the new infectiousness state S, $v_{j,k}$ is a state transition probability from the new infectiousness state S to another infectiousness state j. For example, an algebraic equation (15) corresponding to a group of agents wherein each of the agents have k neighbors and for a new infectiousness state that is equal to a normal state may be generated based upon the state transition diagram 55.

$$\dot{x}_{N,k}=((1-\mu)x_{Rk}+(1-\mu)(1-\delta)x_{Nk})-((1-\mu)q\delta x_{Fk}+\mu x_{Dk}+ \\ (1-\mu(1-q)\delta x_{Hk}+(1-\mu(1-d))x_{Nk} \quad (15)$$

It may be noted that a number of algebraic equations may be equal to a multiple of the total number of the new infectiousness states and the total number of groups of agents in the list. Moreover, at step 708, the existing one or more equilibrium points may be determined by the diagnoser layer 16. The equilibrium points, for example, may be determined by equating each of the algebraic differential equations 58 equal to zero. In other words, the equilibrium points may be determined by equating each of the change in the number of agents that have a new infectiousness state S equal to zero. Furthermore, at step 710, a stability of the equilibrium points may be determined. The stability of the equilibrium points may be determined by utilizing one or more techniques including a Lyapunov stability technique, Jacobian method, or the like.

As shown in FIG. 7, at step 712, a trajectory map may be generated utilizing the equilibrium points. In one embodiment, the trajectory map may be generated based upon the stability of the equilibrium points. The trajectory map, for example, may be generated from current infectiousness states of the agents 38, 40, 42 to the equilibrium points based upon the stability of the equilibrium points.

Subsequent to the generation of the trajectory map, a check may be carried out at step 714 to determine if there are one or more cascading faults in the self-healing power grid 10. The check may be carried by analyzing the trajectory map. For example, in one embodiment, when the trajectory map ends up in an asymptotically stable equilibrium point with a mean total number of Faulted states (F) and Hidden Faulted (H) states for each group of agents with k neighbors equal to zero then there is no cascading fault. Similarly, in another embodiment, when the trajectory ends up in an asymptotically stable equilibrium point with a non-zero mean total number of Faulty (F) and Hidden Faulty (H) states for any group of agents with k neighbors then there is a cascading fault. In such an embodiment, the criticality of the cascading fault may be a ratio of a total number of Faulted (F) states and Hidden Faulted (H) states to a total number of agents in the self-healing power grid 10. It may be noted that the total number of Faulted states (F) and Hidden Faulted states (H) are given by equilibrium points.

Accordingly, at step 714, if it is verified that there are no cascading faults in the self-healing power grid 10, then the control is transferred to step 716. At step 716, the cascading fault flag 56 may be generated that notifies that there are no cascading faults in the self-healing power 10. However, at step 714, if it is verified that there are one or more cascading faults in the self-healing power grid 10, then the control may be transferred to step 718. At step 718, the cascading fault flag 56 may be generated that notifies one or more cascading faults in the self-healing power grid 10.

FIG. 8 is a flow chart representing an exemplary method 314 for determining preventive measures by the prevention layer 18. More particularly, the process explains step 314 of FIG. 3. As shown in FIG. 8, reference numeral 56 is representative of the cascading fault flag that is generated by the diagnoser layer 16 at step 310 of FIG. 3 and steps 716 or 718 of FIG. 7. In addition, reference numeral 58 is representative of the algebraic differential equations that are generated by the diagnoser layer 16 at step 704 of FIG. 7. As previously noted, the cascading fault flag may be used to refer to a value that identifies one or more cascading faults in a self-healing power grid. The method continues at step 802 where the prevention layer 18 may receive the cascading fault flag 56 and the algebraic differential equations 58 generated by the diagnoser layer 16 (see FIG. 1).

Furthermore, at step 804, a check is carried out to verify if there are one or more cascading faults in the self-healing power grid 100. At step 804, if it is verified that there are no cascading faults in the self-healing power grid 10, then the control may be transferred to step 806. At step 806, the prevention layer 16 may declare that there is no need of preventive measures. It may be noted that the preventive measures are not required since there are no cascading faults in the self-healing power grid 10. As previously noted with reference to FIG. 1, the preventive measures may be one or more steps that may vary a prevention rate and a fault-spreading rate in the self-healing power grid. The preventive measures, for example, may include an automatic load-shedding, a controlled islanding, changes in the topology, a rewiring the agents layer 14, or the like.

However, at step 804, if it is verified that there are one or more cascading faults in the self-healing power grid 10, then the control may be transferred to step 808. At step 808, a plurality of equilibrium points may be determined by the prevention layer 18. It may be noted that the equilibrium points may be determined to determine one or more values of input parameters that may result in cascading-fault free equilibrium states. The plurality of equilibrium points, for example, may be determined by using the algebraic differential equations 58. In one embodiment, the plurality of equilibrium points may be determined via prior mathematical analysis and hard coded to the system or a table is created with varying values of prevention and fault-spreading rates. In certain embodiment, the equilibrium points may be determined based upon one or more optimization tools, such as, linear programming may be used for determining the optimal values for prevention and fault-spreading rates that maximizes the rate of approach to the cascading-fault free equilibrium for fast recovery or minimizing fuel cost for generators within the possible boundaries of prevention and fault-spreading rates. Furthermore, at step 810, one or more preventive measures may be determined. The preventive measures, for example, may include an automatic load-shedding, a controlled islanding, changes in the topology, a rewiring the agents layer 14, or the like.

The various embodiments result in determination of potential faults or failures in power grids. The application of present techniques result in a real-time determination of the potential faults or failures in power grids. Furthermore, the present system and techniques facilitates determination of potential faults that may result in cascading faults. The present techniques also prevent blackouts in a city, a country or a continent. Also, the embodiments enable the power grids to self heal before occurrence of faults or failures in power grids.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for determining a self-healing power grid status, comprising:
receiving respective real-time monitoring data corresponding to one or more power grid components, wherein one or more agents are coupled to said power grid components;

determining a respective current infectiousness state based upon the received respective real-time monitoring data;

determining respective output data based upon the respective current infectiousness state;

exchanging the respective output data with one or more neighboring agents;

generating one or more state transition probabilities based upon one or more parameters and a state transition diagram; and generating a respective new infectiousness state based upon the one or more state transition probabilities.

2. The method of claim 1, wherein receiving the respective real-time monitoring data comprises:

generating the respective real-time monitoring data by observing real-time characteristics of the one or more power grid components; and sending the respective real-time monitoring data to respective agent.

3. The method of claim 1, wherein determining the respective output data comprises verifying whether the respective current infectiousness state is a dead state.

4. The method of claim 1, wherein exchanging the respective output data with the one or more neighboring agents comprises:

transmitting the respective output data to the one or more neighboring agents; and receiving output data corresponding to the one or more neighboring agents.

5. The method of claim 1, wherein the one or more parameters comprises a fault spreading rate, a power grid component removal rate, an observation probability, or combinations thereof.

6. The method of claim 1, further comprising:

determining one or more cascading faults based upon the respective new infectiousness state and the state transition diagram; and generating a cascading fault flag based upon the determination of the one or more cascading faults.

7. The method of claim 6, further comprising determining one or more preventive measures based upon the cascading fault flag.

8. The method of claim 1, further comprising:

updating the respective current infectiousness state by equating the respective new infectiousness state to the respective current infectiousness state; and generating respective updated output data based upon the updated respective current infectiousness state.

9. A self-healing power grid, comprising:

a plurality of power grid components;

a plurality of monitoring layers coupled to the power grid components, wherein the plurality of monitoring layers observe one or more real-time characteristics of the plurality of power grid components to generate respective real-time monitoring data;

a plurality of agents communicatively coupled to one or more of the plurality of monitoring layers, wherein one or more of the plurality of agents:

receive the respective real-time monitoring data corresponding to one or more power grid components;

determine a respective current infectiousness state based upon the received respective real-time monitoring data;

determine respective output data based upon the respective current infectiousness state;

exchange the respective output data with one or more neighboring agents;

generate respective new infectiousness state based upon the respective exchanged output data;

generate one or more state transition probabilities based upon one or more parameters and a state transition diagram; and generate the respective new infectiousness state based upon the one or more state transition probabilities.

10. The power grid of claim 9, wherein the respective real-time monitoring data comprises status alarms, limit violation alarms, power outages, power outage distribution factors, network topology, operational state, or combinations thereof.

11. The power grid of claim 9, wherein the one or more real-time characteristics comprise voltage, temperature, current, or combinations thereof.

12. The power grid of claim 9, wherein the plurality of monitoring layers comprise an energy management system (EMS), a system data exchange (SDX), a system control and data acquisition system (SCADA), a topology processor, or combinations thereof.

13. The power grid of claim 9, wherein the plurality of power grid components comprises regional transmission operators, transmission substations, distribution substations, distributed energy sources, load serving entities, generators, distribution control systems, transmission lines, distribution lines, extra high voltage system, high voltage system, medium voltage system, transformers, regional transmission organization, softwares, independent system operator, power grid organizations, energy management systems (EMS), system control and data acquisition systems (SCADA), field remote terminals (RTU), master stations, control areas, a topology processor, interchange distribution calculator, or combinations thereof.

14. The power grid of claim 9, wherein the respective current infectiousness state or the new infectiousness state comprises a normal state, a dead state, a faulted state, a hidden faulted state, a recovered state, or combinations thereof.

15. The power grid of claim 9, further comprising a diagnoser layer that:

determines one or more cascading faults in the self-healing power grid based upon the at least one respective new infectiousness state of the plurality of agents and a state transition diagram; and generates a cascading fault flag based upon the determination of the one or more cascading faults.

16. The power grid of claim 15, further comprising establishing equilibrium points and comparing the at least one respective new infectiousness state to the equilibrium points.

17. The power grid of claim 15, further comprising a prevention layer that determines one or more preventive measures based upon the cascading fault flag.

18. The power grid of claim 9, wherein the plurality of agents further:

update the respective current infectiousness state by equating the respective new infectiousness state to the respective current infectiousness state; and generate respective updated output data based upon the updated respective current infectiousness state.

* * * * *